March 1, 1966 R. T. SAMPSON 3,237,626

CARD GUIDE CONSTRUCTION

Filed May 22, 1963 4 Sheets-Sheet 1

INVENTOR.

Rodney T. Sampson

BY

Frease, Bishop, Johns & Schick

ATTORNEYS

March 1, 1966 R. T. SAMPSON 3,237,626

CARD GUIDE CONSTRUCTION

Filed May 22, 1963 4 Sheets-Sheet 2

INVENTOR.
Rodney T. Sampson
BY
Frease, Bishop, Johns & Schick
ATTORNEYS

March 1, 1966 R. T. SAMPSON 3,237,626

CARD GUIDE CONSTRUCTION

Filed May 22, 1963 4 Sheets-Sheet 3

INVENTOR.

Rodney T. Sampson

BY

Frease, Bishop, Johns & Schick

ATTORNEYS

INVENTOR.
Rodney T. Sampson
BY
Frease, Bishop, Johns & Schick
ATTORNEYS

United States Patent Office 3,237,626

Patented Mar. 1, 1966

3,237,626

CARD GUIDE CONSTRUCTION

Rodney T. Sampson, Canton, Ohio, assignor to Diebold, Incorporated, Canton, Ohio, a corporation of Ohio Filed May 22, 1963, Ser. No. 282,246
24 Claims. (Cl. 129—16.7)

The invention relates to card guide construction, and more particularly to a card guide incorporating a sliding signal for signalling or indicating some selected or predetermined fact or indicia in a card filing system.

Guides of various kinds and types are used extensively in card filing systems for a variety of purposes. Such guides may indicate alphabetical, numerical or subject matter separation, for example, in a series of data or information containing cards filed in a file tray. In their simplest form, such guides usually comprise a single panel or card member, generally the same size as the cards with which the guides are used, and each guide has an upwardly projecting ear containing a particular alphabetical, numerical or subject matter designation.

Guide constructions also are used extensively of a so-called two-panel type formed of two sheets or panels of transparent material, such as vinyl material, in order to provide a pocket between the two panels of the guide for the reception of records, papers, smaller sized cards, etc.

Such two-panel guides also frequently contain alphabetical or numerical designations in an auxiliary pocket related or assigned to the record contained in the main guide pocket. Such two-panel guides may be used in card filing systems in connection with cards or other records filed in the card file adjacent and related to the particular subject matter of the record contained in a particular two-panel guide pocket.

Further, such two-panel guides frequently are integrated in a card file with simple single-panel guides having upstanding ears containing alphabetical, numerical or subject matter designations. In such instances, the upper edges of the two-panel guides are notched downwardly at desired locations to display information contained on the upstanding ears of adjacent single-panel guides.

In the use of card filing systems, it is often desired to signal the existence or occurrence of particular similar facts or indicia indicated or related to particular guides in an entire group of guides of a complete card file system or installation, so that the particular facts, indicia, etc. can be located quickly by scanning the card file.

Difficulties have been inherent in the use of signal devices heretofore utilized in various card files and various prior types of guides. These difficulties have involved signal shape, location, projection, or instability with respect to the card or guide with which the signal is associated. Thus, some signal devices have involved a local thickening of a zone or area of the associated card or guide which is objectionable because when a number of such guides are in a file tray, the thickened zones pile up on one another and occupy unequal space in the file tray. Inefficient use of tray space results; and the pile-up thickened zones may interfere with efficient manipulation of the card file system in use.

Other prior signal devices have involved a member projecting from the edge or face of its associated card or guide. The projecting member may be a means for mounting or housing the signal device; or the projecting member may be a part of the signal device itself to provide for adjustment of the signal when desired. Any such projecting member may reduce card file capacity, or the projecting member may catch on other objects or be moved accidentally in the normal use of the card file.

Accidental movement of the signal device changes or alters the signal intended to be given.

Another difficulty has involved the inherent probability of movement of prior signal devices, incident to movement or flipping of the cards and guides in the card file system during normal use thereof, unless special means are associated with the signal devices to prevent such undesired or accidental signal device movement. The provision of special signal movement preventing means on the other hand, ordinarily has involved either an undesirable thickening of the signal containing card or guide, or physical projection of the special signal movement preventing means from the associated card or guide which can catch on adjacent cards or interfere with convenient manipulation, extraction or insertion of adjacent cards or records.

Accordingly, it is a general object of the present invention to provide a new sliding signal guide construction in which the signal device remains stably located at any adjusted position without movement from such position during or incident to normal movement of the cards and guides in the use of a card file system.

Furthermore, it is an object of the present invention to provide a new sliding signal construction for a two-panel card guide which has a record-receiving pocket and an associated signal device, in which the signal device does not increase the thickness of the two-panel guide and does not project physically beyond the face or edges of the two-panel guide.

Also, it is an object of the present invention to provide a new sliding signal guide construction in which the signal device may be readily and easily adjusted to any desired signalling position, and in which the signal device remains in and is not subject to accidental displacement from such adjusted position in use.

Moreover, it is an object of the present invention to provide a new sliding signal guide construction including an adjustable signal member and an associated signal scale, in which the signal scale is removable so that various desired or selected scales may be used with any particular sliding signal guide, and in which the signal scale is held in a predetermined position and against accidental movement from such position incident to movement or manipulation of the guide and adjacent cards in a card filing system in use.

In addition, it is an object of the present invention to provide a new sliding signal guide construction including an adjustable signal member, in which no special signal movement preventing means is required or used to maintain the signal member stably located at an adjusted position and against movement from such position during or incident to normal movement or flipping of cards and guides in the use of a card file system.

Furthermore, it is an object of the present invention to provide a new sliding signal guide construction having an adjustable signal member and an associated signal scale to provide a primary signal, in which the signal member and scale are so constructed, arranged and related as to give a secondary visible signal, a number of which visible signals can be seen at one time in a group of improved guides contained in a card file system without physical projection of the visible signal member from the edges or faces of the fixed guide shape of a guide of any particular size.

Also, it is an object of the present invention to provide a new sliding signal guide construction incorporating and combining the various described features and which may be undercut or notched at its top edge to permit integrated use with supplemental guides.

Finally, it is an object of the present invention to provide a new sliding signal card guide construction eliminating difficulties heretofore encountered in the art;

utilizing simple, inexpensive and readily assembled components, providing great flexibility in use; achieving the stated objects in a simple, effective and inexpensive manner; and solving problems and satisfying needs existing in the art.

These and other objects and advantages, apparent to those skilled in the art from the following description and claims, may be obtained, the stated results achieved, and the described difficulties overcome, by the apparatus, combinations, parts, elements, subcombinations, arrangements, relationships, devices and constructions which comprise the present invention, the nature of which is set forth in the following general statement, preferred embodiments of which—illustrative of the best modes in which applicant has contemplated applying the principles —are set forth in the following description and shown in the drawing, and which are particularly and distinctly pointed out and set forth in the appended claims forming part hereof.

The nature of the improved sliding signal guide construction of the present invention may be stated in general terms as including, a two-panel guide comprising front and rear panels preferably formed of transparent vinyl plastic material and preferably generally rectangular in shape; the guide having top, bottom and side edges; the panels being integrated, fixed, sealed or otherwise secured together along portions at least of the top and bottom guide edges; means forming a series of pockets between the two panels each accessible from at least one edge of the guide; the pockets preferably including a main record-receiving pocket, a signal scale-receiving pocket, a sliding signal-receiving pocket, and preferably a designator pocket for receiving a designating name, account number, etc.; the scale and designator pockets extending along the top edge of the guide one from each top corner toward the other; the signal pocket communicating with the scale pocket; the top edge of the guide preferably being undercut or formed with a notch intermediate the side edges of the guide; guide retainer ear means preferably projecting downward from the bottom edge of the guide; a signal scale having signalling indicia along its top edge removably inserted in said scale pocket; interengageable means formed on the scale and guide holding the scale against movement laterally of the scale pocket when in engaged position; the upper indicia containing edge of the signal scale when the scale is in engaged position being spaced downwardly of the top guide edge; a preferably L-shaped signal member having a slide leg and a signal leg, the signal member being removably received in said signal and scale pockets with the slide leg slidable in the signal pocket and the signal leg slidable in the scale pocket; the panels each being formed with an opening communicating with each other and at least with the signal pocket whereby the slide leg of the signal may be grasped through said openings to move the slide leg along the signal pocket and to position the signal leg in the scale pocket at a predetermined position with respect to the indicia on the scale; the signal leg preferably being disposed between the front guide panel and the signal scale when sliding to adjusted position in the scale pocket; the signal leg preferably being provided with a signal opening or window registering with a selected signal indicia when in adjusted positon; and the upper end of the signal leg extending above the upper edge of the scale in the scale pocket when the signal leg is in signalling position and the scale is in engaged position, whereby said upper end is visible through both transparent guide panels.

By way of example, embodiments of the improved sliding signal guide construction are shown in the accompanying drawings forming part hereof in which.

Similar numerals refer to similar parts throughout the various figures of the drawings.

The improved sliding signal guide construction is illustrated and described in connection with card file system that may be used by a collection agency for collecting past-due or delinquent accounts wherein the original record of the account, such as a copy of an invoice or the original order and other identifying data on cards, may be permanently preserved in a pocket and visible through a panel of a two-panel guide, and wherein a guide signal is used to indicate a date on which collection procedures are to be followed up with particular reference to the particular account. Other papers or cards or data relating to the particular account may be filed in the card file immediately preceding the improved guide for the particular account.

It is to be understood, however, that the improved sliding signal guide construction may be used in connection with many other procedures, such as the maintenance of tool or inventory records, or advanced date planning of controls or procedures with respect to data contained in a card file system, etc.

The improved construction includes a two-panel guide generally indicated at 1, a signal scale component (FIG. 4) generally indicated at 2 and a signal member (FIG. 5) generally indicated at 3.

Figures 1, 2, 3:
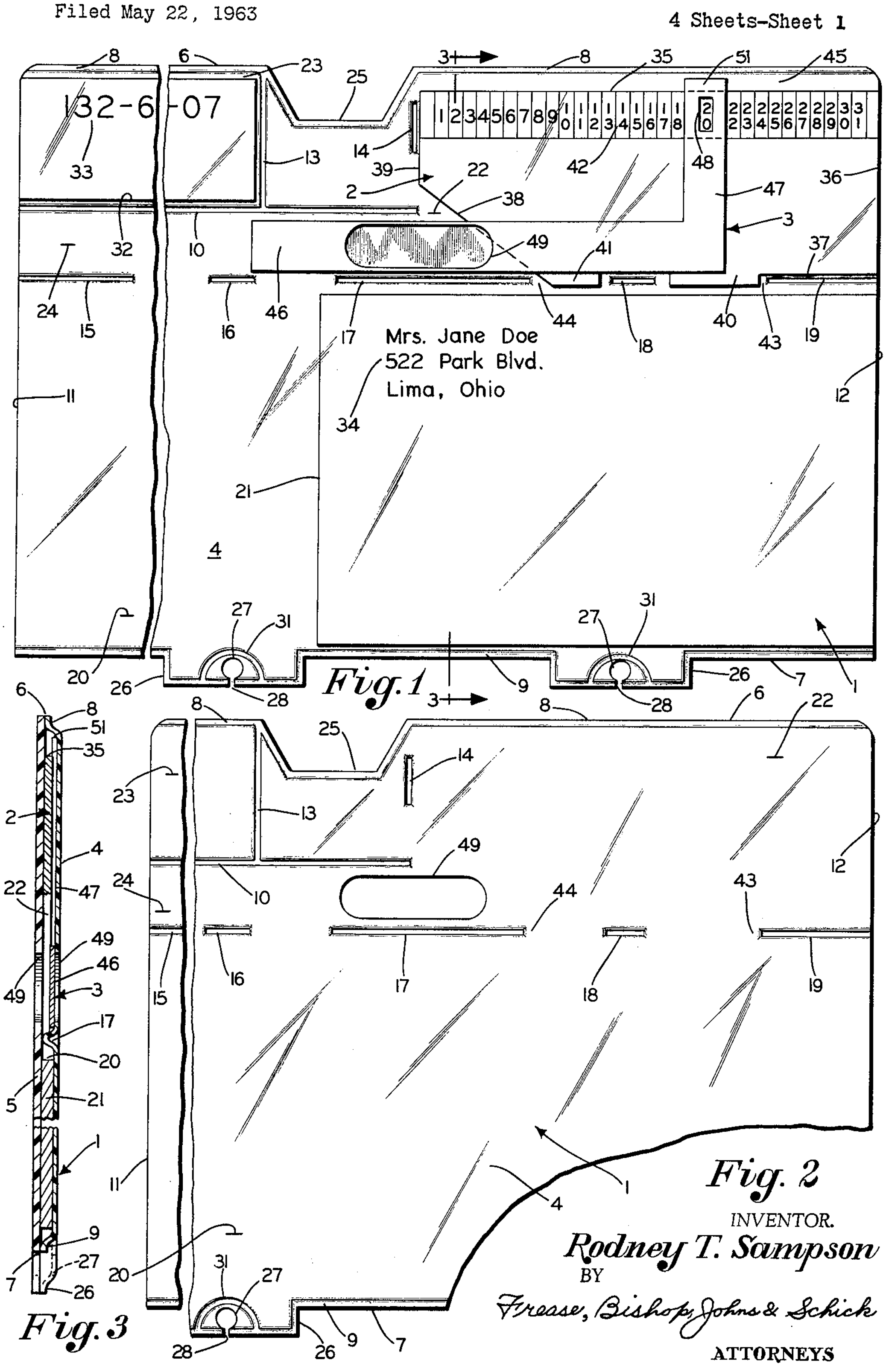
FIGURE 1 is a plan view with parts broken away of the improved sliding signal guide construction, illustrated full size for use in connection with a card file for 5 x 8 cards.
FIG. 2 is a front elevation, with parts broken away, of the two-panel guide component of the improved guide construction illustrated in FIG. 1.
FIG. 3 is an enlarged somewhat diagrammatic section of the improved guide construction taken on the line 3—3, FIG. 1.

Referring to FIGS. 1, 2 and 3, the two-panel guide 1 comprises front panel 4 and rear panel 5 each preferably formed of transparent vinyl plastic material. Panels 4 and 5 are generally rectangular in shape. Preferably rear panel 5 is considerably thicker and stiffer than front panel 4, the thicknesses of each being exaggerated in FIG. 3 to more clearly illustrate the construction. Front and rear panels 4 and 5 are integrated, fixed, sealed or otherwise secured together by heat-pressure or electronic seals along top edge 6 and bottom edge 7 of the guide 1, as indicated, respectively, by indentations 8 and 9 in front panel 4. An additional linear, indented, heat-pressure seal 10 is formed between panels 4 and 5 parallel with and spaced below top edge 6 of guide 1, preferably extending about half-way from left side edge 11 toward right side edge 12 of guide 1. Preferably, a vertical indented heat-pressure seal 13 extends between seals 8 and 10 at a location intermediate the side edges 11 and 12 of guide 1.

Another short vertical indented seal 14 is provided between panels 4 and 5, preferably aligned with the right-hand end of seal 10 and preferably located substantially midway between side edges 11 and 12 of guide 1. Seal 14 preferably does not connect with seals 8 and 10.

Another series of disconnected, aligned, linear seals 15, 16, 17, 18 and 19 is formed between panels 4 and 5 parallel with seal 10 and top edge 6 of guide 1, and spaced below seal 10. The indented seals described between front and rear panels 4 and 5 form a series of pockets between panels 4 and 5 of two-panel guide 1.

A main record pocket indicated at 20 is formed between bottom edge seal 7 and aligned seals 15–19, the pocket 20 extending from side edge 11 to side edge 12 of guide 1 and being open at each end for receiving and storing a desired record, such as an original purchase order or a record card indicated at 21 in FIGS. 1 and 3, or both. The record, paper, record card 21, etc. may have a typical thickness occupying the normal space provided in pocket 20 between panels 4 and 5 determined by the depth of indentation of the seals, such as seals 8, 9 and 17, as illustrated in FIG. 3.

Seals 8, 14, 17, 18 and 19 form a scale pocket 22 at the upper right-hand corner of guide 1, the pocket 22 being open or accessible at right-hand edge 12 of guide 1.

Seals 8, 10 and 13 form a designator pocket 23 at the upper left-hand corner of guide 1, the pocket 23 being open or accessible at left-hand edge 11 of guide 1. Thus, scale and designator pockets 22 and 23 extend toward each other along top edge 6 of guide 1 from each top corner.

Seals 10, 15, 16 and 17 form a signal pocket 24 below designator pocket 23 open or accessible at left side edge 11 of guide 1 and communicating at its right-hand end with scale pocket 22.

The top edge 6 of guide 1 preferably is undercut or formed with a notch 25 intermediate side edges 11 and 12 of guide 1, and intermediate pockets 22 and 23, for a purpose to be later described. If the undercut 25 is omitted, seal 13 also may be omitted and pocket 23 will be larger, extending from left-hand edge 11 to seal 14.

Guide 1 is preferably formed with guide retainer ear means or feet 26 projecting downward from bottom edge 7 of guide 1 and formed with holes 27 and a communicating slit 28. The holes 27 are adapted to removably engage retaining rods 29 (FIG. 12) of a card file tray 30.

Preferably, an arched heat-pressure seal 31 surrounds each retainer rod hole 27 to assist in preventing cracking of the thick stiff vinyl material from which the rear panel 5 is preferably formed, when the material is flexed to engage or disengage retainer ears 26 with card tray retainer rods 29.

The designator pocket 23 may be used to receive a caption insert card 32 or other record device containing a name, or subject matter designation, or an account number, such as indicated at 33 in FIG. 1. The account number 33, for example, may be that assigned to a name 34 which may appear on a record card 21 stored in record pocket 20 of guide 11.

Figures 9, 10, 14:
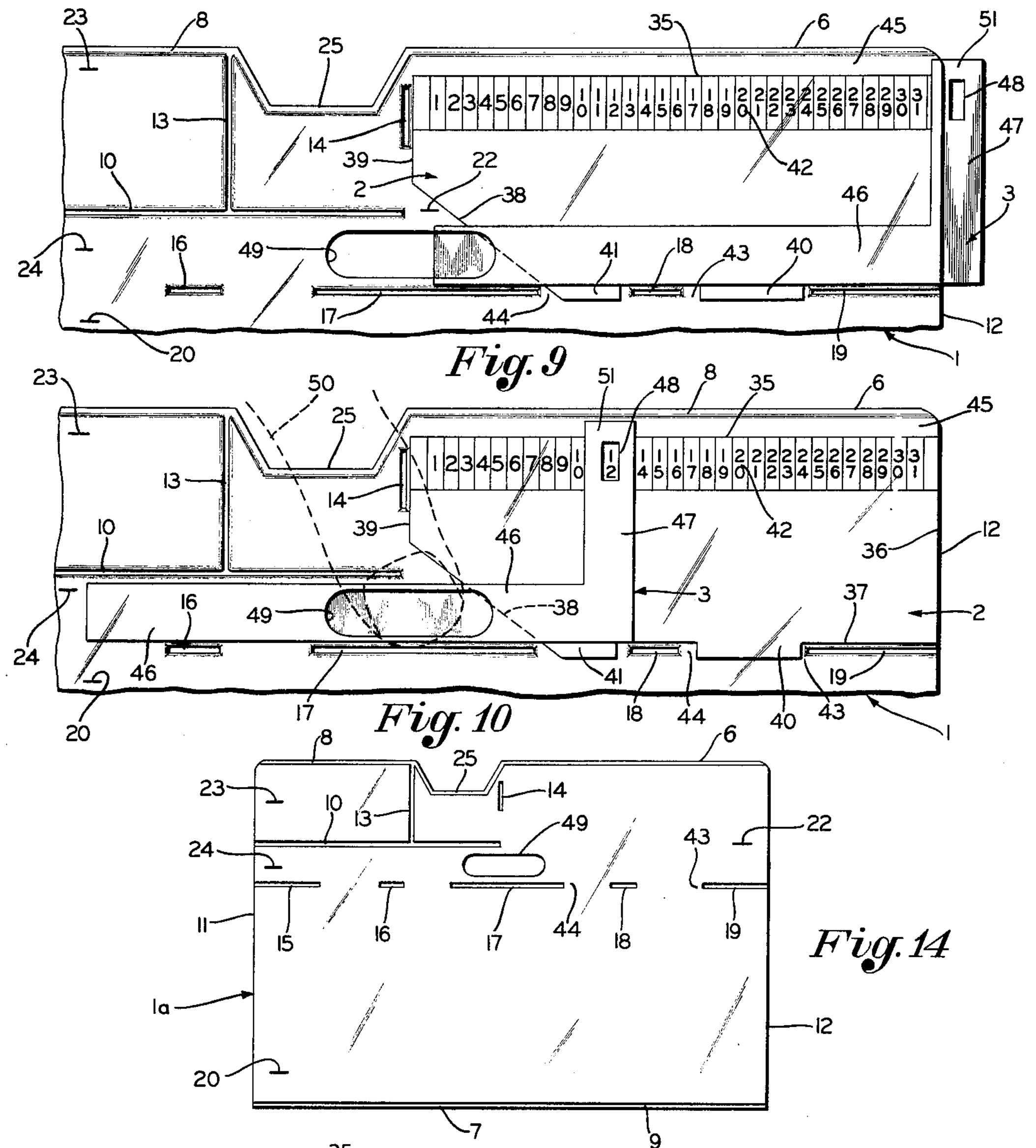
FIG. 9 is a view similar to FIGS. 6, 7 and 8 illustrating an initial step in the assembly of the signal component with the guide and scale components of the improved guide construction.
FIG. 10 is a view similar to FIG. 9 but showing the manner in which the signal component may be moved to a selected signalling position.
FIG. 14 is a view on a smaller scale similar to FIG. 2 of a slightly modified form of two-panel guide component.

Alternately, the improved two-panel guide may omit ears 26 where it is not desired to secure the guide to retaining rods in a card tray, as illustrated in the two-panel guide generally indicated at 1*a* in FIG. 14 whose construction is otherwise the same as that of the guide 1.

Figure 15:
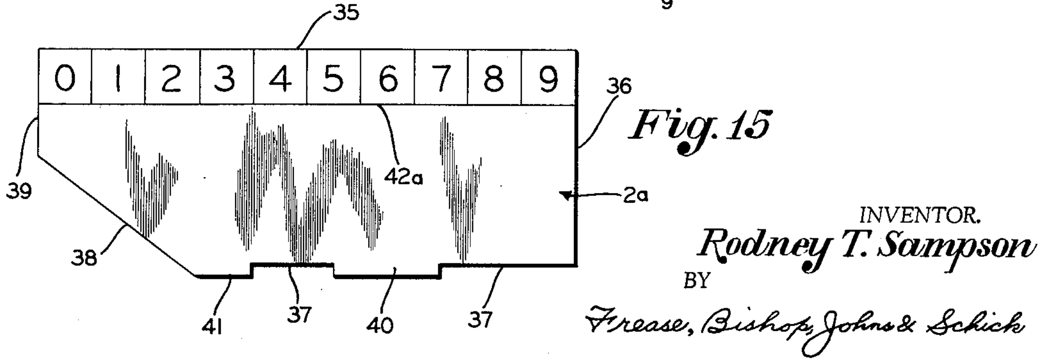
FIG. 15 is a view similar to FIG. 4 of a modified form of scale component.

Signal scale component 2 (FIG. 4) is preferably a generally rectangular, cut and printed paper card having a top edge 35, a square right edge 36, a bottom edge 37 parallel with top edge 35, an angularly cut lower left-hand corner 38 and a lower left-hand edge 39. Bottom edge 37 is formed with spaced feet 40 and 41 projecting downward for a purpose to be described. A signalling indicia scale is printed throughout the width of scale 2 along top edge 35 thereof, the indicia being indicated at 42 and comprising a "31-scale" representing the 31 days of a month. Alternately, scale 2 may have a different size with a different number of markers, for example, the digits 0–9, as indicated at 42*a* on scale 2*a* of FIG. 15.

Another example of scale would contain markers for the months of the year. Also, the scale 2 and scale pocket 22 may be smaller in vertical dimension, if desired, by decreasing the height of designator pocket 23. In this event, the record pocket could be increased in height and the signal pocket 24 moved up.

The width of scale 2 or 2*a* equals the distance between right-hand edge 12 of guide 1 and vertical seal 14. The height of scale 2 or 2*a* from top edge 35 to bottom of feet 40–41 is approximately equal to the distance between top edge seal 8 and disconnected seals 17, 18 and 19 of guide 1 as illustrated in FIG. 6.

Figures 4, 5, 6, 7, 8:
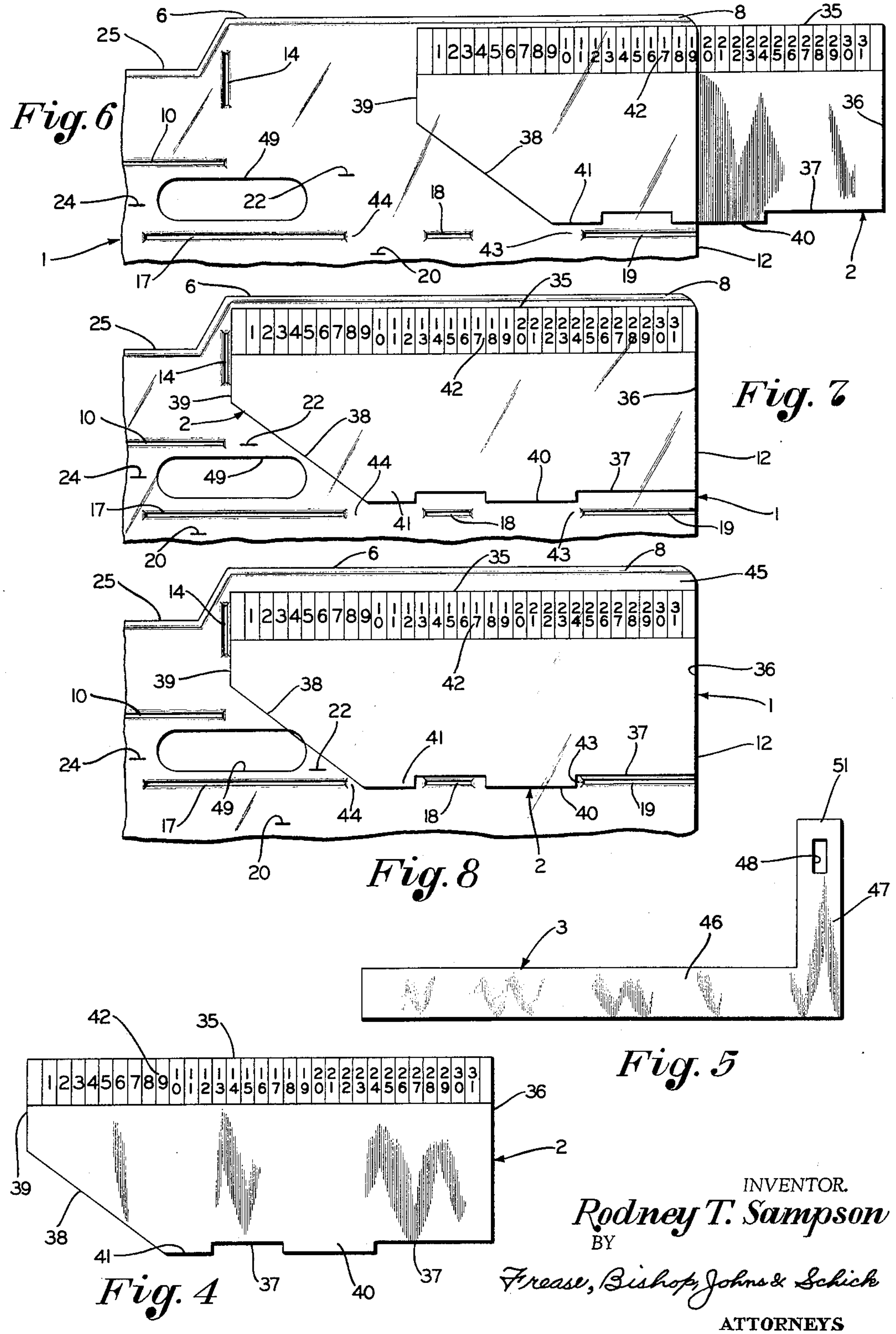
FIG. 4 is a full size elevation of the signal scale component of the improved guide construction illustrated in FIG. 1.
FIG. 5 is a full size elevation of the signal member component of the improved guide construction illustrated in FIG. 1.
FIG. 6 is a fragmentary elevation of parts of the guide and scale components, illustrating an initial step in the assembly of the guide and scale components.
FIG. 7 is a view similar to FIG. 6 showing a further step in the assembly.
FIG. 8 is a view similar to FIGS. 6 and 7 illustrating the final step in the assembly of the guide and scale components.

Thus, scale 2 or 2*a* may be inserted in scale pocket 22 through right-hand open end of pocket 22, as illustrated in FIG. 6, and moved laterally to the position shown in FIG. 7 with scale edge 39 abutting seal 14 and scale edge 36 aligned with guide edge 12. Ears 26 of guide 1 then may be tapped against a flat surface to move scale 2 from the position of FIG. 7 to that of FIG. 8. During such movement feet 40 and 41 enter passages 43 and 44, respectively, formed between the adjacent ends of seals 19, 18 and 17.

Thus, scale 2 is held in pocket 22 when scale 2 is in "engaged" position illustrated in FIG. 8 with feet 40 and 41 interengaged in passages 43 and 44, against movement laterally of guide 1. Friction between surfaces of scale card 2 and the inner surfaces of guide panels 4 and 5 assist in maintaining scale 2 in the engaged position described as illustrated in FIG. 8.

When scale 2 is in engaged position, its top edge 35 is spaced downwardly of seal 8 at top edge 6 of guide 1 a substantial distance as indicated at 45 in FIG. 8. The space 45 above top edge 35 of scale card 2 and above the signalling indicia 42 along the top edge of the scale provides visibility through transparent panels 4 and 5 of guide 1 adjacent the top edge of the guide and above scale card 2.

Signal member 3 is preferably L-shaped as illustrated in FIG. 5 and comprises a slide leg 46 and a signal leg 47. Leg 47 is preferably provided with signal indicating means such as signal opening or window 48.

Signal member 3 may be removably entered into pockets 22 and 24 as illustrated in FIGS. 9 and 10 through the open end of pocket 22 at the right-hand edge 12 of guide 1. Slide leg 46 is received and slides in signal pocket 24 and signal leg 47 is received and slides in scale pocket 22 between the top face of scale 2 and the inner face of top panel 4 of guide 1. Panels 4 and 5 each are formed with matching openings indicated at 49. Openings 49 are elongated and communicate with scale and signal pockets 22 and 24. Openings 49 are located between seals 10 and 17 and preferably centrally below seal 14.

Thus, scale slide leg 46 may be grasped through openings 49 by the thumb and finger of a hand, indicated at 50, from the front and rear faces of guide 1 to slide signal member 3 to any desired position of adjustment of its signal leg 47 with respect to scale 2. In this manner, signal indicator 48 of signal member 3 may be located at a desired position over a selected signal indicia at the top edge of scale 3, such as the number "12" as illustrated in FIG. 10, or the number "20" as illustrated in FIG. 1.

Signal member 3 preferably is formed from thin sheet plastic material and may be used in a variety of different colors, such as red, blue, green, etc., for indicating different signal classifications. Friction between the surfaces of signal member 3, the inner faces of panel members 4 and 5, and the surface of scale 2 hold signal member 3 in any adjusted position.

When signal leg 47 is in any selected signalling position, such as the positions shown in FIGS. 1 and 10, the upper end 51 of signal leg 47 above signal window 48, projects above top edge 35 of scale card 2 when scale card 2 is in engaged position as shown. Thus, the upper end 51 of signal leg 47 of signal member 3 is visible through both transparent guide panels 4 and 5 of guide 1 along the space 45 between the top edge 35 of scale card 2 and top edge 6 of guide 1.

Holes 27 in guide retainer feet 26 have a close fit with retaining rods 29 of card tray 30 (FIG. 11) such that taken with the stiffness of the two-panel guide 1, the guide will stand substantially upright with a limited amount of tilt. However, any guide 1 may slide along retainer rods 29 to any position in a tray 30. Further, the flexibility of the guide permits it to be bent or flexed by grasping the guide, to positions permitting visibility of or access to the contents of the various guide pockets.

In normal use, a guide 1 in a tray 30 may move along retainer rods 29 forwardly or rearwardly of the tray, and flexing of a guide also involves movement generally forward or rearward of the tray. Such movements, however, do not disturb the engaged position of scales 2. Further, scales 2 are substantially locked in engaged position by the interengagement of feet 40 and 41 with passages 43 and 44 so that lateral movement of a guide when removed from a file tray 30 does not disturb the position of scale 2.

Furthermore, normal movement or manipulation of a guide 1 in a file tray 30 does not disturb the position of a signal 3 from its set or selected signalling position.

Referring to FIGS. 1 and 3, the scale and signal components 2 and 3 are always enclosed within pockets of the two-panel guide, neither component projects beyond an edge or surface of the guide or either of its panels, and the thickness of the guide 1 is not increased beyond the thickness of the panels 4 and 5 and of the pocket 20 provided for record retention.

Thus, the provision of signal devices in the improved guide 1 does not result in any localized thickening of the guide and there are no signal or signal mounting projections to catch or be caught by other cards processed in a file. No signal projections are presented which accidentally can be moved to accidentally change a signal setting.

Figures 11, 12, 13:
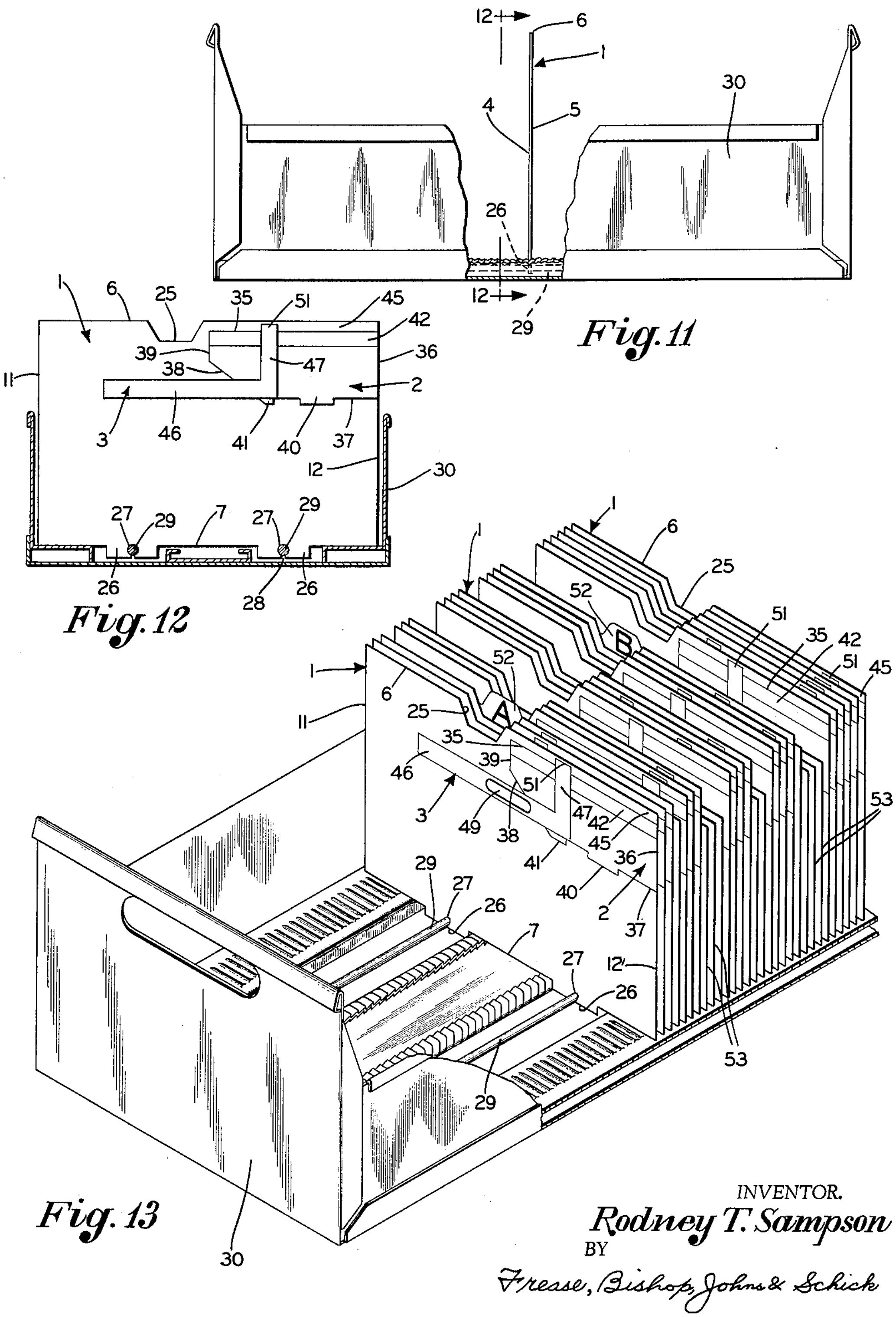
FIG. 11 is a side elevation, with parts broken away, of a card file tray diagrammatically illustrating the improved guide construction therein.
FIG. 12 is a section taken on the line 12—12, FIG. 11, diagrammatically illustrating the improved guide construction.
FIG. 13 is a fragmentary perspective view illustrating diagrammatically the use of the improved guide construction in a typical card file tray.

A number of improved sliding signal guides are illustrated in FIG. 13 in a card tray 30 a swell as single panel alphabetic guides 52 carrying the letters A and B on usual upwardly projecting tabs. Notches 25 in the upper edges of guides 1 permit visibility of the typical single panel guides 52 when the use of single panel guides for alphabetic, numeric or subject matter classification is integrated with the use of the improved guides, without either of guides 1 or 52 projecting above the highest top edge of the other, so that maximum card tray space is utilized.

Normal card file cards, such as 5 x 8 cards, are also illustrated at 53 in FIG. 13 and such cards can be used in any desired numbers in card file systems in which the improved sliding signal guides 1 are used. The top edges of cards 53 are below and do not cover the signals or signalled indicia, as shown.

The projection of the top end 51 of signal leg 47 above the top edge 35 of scale 2 so that it is visible above the scale and along the space 45 between the top edge 35 of the scale and the top edge 6 of the guide 1, is particularly advantageous. The projecting signal ends 51 (FIG. 13) are visible entirely along the card file so that all signals located at a particular position of adjustment can be located quickly by scanning the top of the card file without flipping each and every individual card or guide.

Another characteristic of the improved construction is that the scale 2 occupies substantially one-half of the width of the guide between the edges 11 and 12 of the latter. This is required since the signal 3 must be capable of movement throughout the length of the scale 2 and the slide leg 46 of signal 3 must be retained by the guide throughout such movement in the signal pocket 24 which limits the direction of movement of signal 3.

The scale 2 has been indicated as containing the signalling indicia 42 printed thereon and formed as a paper card. The scale 2 does not necessarily have to be a printed paper form since the signalling indicia 42 could be printed on transparent sheet material. Alternately, where production costs permit, the indicia scale 42 can be printed directly on either one of the panels 4 or 5 at the position assumed when a scale 2 is located in scale pocket 22 as shown in FIG. 1. This eliminates scale 2 as a separate card insert and incorporates the indicia 42 directly on one of the transparent panel members with its location and arrangement with respect to the other elements of the improved construction such that the construction functions in identically the manner described.

As a further alternative, the indicia 42 may be printed on transparent, pressure sensitive, adhesive tape and applied at the location indicated in FIG. 1 directly to one of the surfaces of one of panels 4 and 5, or the indicia may be printed on opaque tape and applied to one of the surfaces of the panel 5. In either event, signal 3 functions in the same manner as described to provide a desired signal setting with respect to such signalling indicia.

Accordingly, the improved construction of the present invention provides a new sliding signal guide construction which eliminates innumerable difficulties heretofore encountered in the art, achieves the stated objects, accomplishes the many new functions and results described, provides for new card file systems and operations, and solves problems which have existed in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact structures shown, because the sizes and shapes of the various parts and components may be varied to provide other structural embodiments, without departing from the fundamental principles of the invention.

Having now described the features, discoveries and principles of the invention, the construction, operation and use of preferred forms thereof, and the advantageous, new and useful results obtained thereby; the new and useful discoveries, principles, apparatus, combinations, parts, elements, subcombinations, arrangements, structures, devices and cooperative relationships, and mechanical equivalents obvious to those skilled in the art are set forth in the appended claims.

I claim:

1. Sliding signal guide construction for a card file including a two-panel guide having front and rear flat panels generally rectangular in shape with top and side edges; at least the upper portions of the guide panels along the top guide edge and from side to side of the guide being formed of transparent material; means forming a plurality of pockets between the panels accessible from the exterior of the guide; the pockets including a scale pocket and a signal pocket, the scale pocket extending along said transparent upper panel portions and along the top guide edge from one side edge toward the other, the signal pocket communicating with the scale pocket and extending parallel with said top guide edge from said other side edge toward said one side edge; a flat signal member slidable laterally between the side guide edges in said signal and scale pockets between said panels, the signal member having a slide portion slidable in said signal pocket and a signal portion slidable in said scale pocket; signal indicia scale means associated with said scale pocket and extending laterally between the side guide edges adjacent to and parallel with the top guide edge; and the panels being provided with registering openings communicating with at least one of said signal and scale pockets exposing surface portions of the signal member slide portion, whereby surfaces of said signal member slide portion may be grasped from the exterior of the guide to laterally adjust the signal member signal portion in the scale pocket to a selected position with respect to said signal indicia scale.

2. The construction defined in claim 1 in which the guide has a bottom edge, and in which the pockets formed between the panels also include a record pocket located above the bottom guide edge and below the scale and signal pockets.

3. The construction defined in claim 1 in which the pockets formed between the panels also include a designator pocket extending along said transparent upper panel portions and along the top guide edge above the signal pocket from said other guide side edge toward the scale pocket.

4. The construction defined in claim 3 in which each of said scale, signal and designator pockets is accessible from at least one side edge of the guide.

5. The construction defined in claim 1 in which the scale pocket extends from one guide top corner toward an opposite guide side edge substantially one-half the distance between said side edges.

6. The construction defined in claim 1 in which the top guide edge is formed with a notch intermediate the guide side edges.

7. The construction defined in claim 1 in which the front and back guide panels are formed of transparent plastic material.

8. The construction defined in claim 1 in which the scale pocket extends from one guide top corner toward the other top corner, in which the pockets formed between the panels also include a designator pocket extending from the other guide top corner toward said one top corner, and in which the top guide edge is formed with a notch intermediate the guide side edges.

9. The construction defined in claim 1 in which the guide has a bottom edge, and in which retainer ear means project downwardly from the bottom edge of the guide.

10. The construction defined in claim 1 in which the guide has a bottom edge, in which the front and rear panels are sealed together along the top and bottom guide edges by linear seals, and in which the means forming a plurality of pockets between the panels comprises spaced linear seals.

11. The construction defined in claim 10 in which the front and back guide panels are formed of transparent plastic material, in which retainer ear means project downwardly from the bottom edge of the guide, in which the ear means are formed with retainer rod receiving holes and a communicating slit, and in which an arched seal between the panels surrounds each retainer rod hole.

12. The construction defined in claim 1 which the signal member is L-shaped with a slide leg portion and an upstanding signal leg portion, in which the signal member is removably received in said signal and scale pockets with the slide leg laterally slidable between the guide side edges in the signal pocket and with the upstanding signal leg slidable in the scale pocket.

13. The construction defined in claim 12 in which the upstanding signal leg has an upper end, and in which said upper end projects within said scale pocket above the signal indicia scale means as said signal leg slides in said scale pocket.

14. The construction defined in claim 12 in which the upstanding signal leg is provided with signal indicating means registrable with a selected indicia of said signal indicia scale means when the signal leg is adjusted in the scale pocket.

15. The construction defined in claim 14 in which the signal indicating means comprises an opening formed in the upper end of the upstanding signal leg.

16. The construction defined in claim 1 in which the signal indicia scale means which extends parallel to the top guide edge is spaced from the top guide edge to provide a strip-like transparent zone above the scale means and below the top edge of the guide, and in which the signal portion of the signal member has a top end projecting in the scale pocket between the guide panels into said strip-like zone at any position of adjustment of the signal member.

17. The construction defined in claim 1 in which the signal indicia scale means comprises a scale member removably inserted in the scale pocket having signalling indicia along its top edge; and in which interengageable means are formed on the scale member and guide, holding the scale member against movement laterally of the scale pocket when in engaged position.

18. The construction defined in claim 17 in which the top indicia containing edge of the scale member when the latter is in engaged position is spaced downwardly of the top guide edge.

19. The construction defined in claim 17 in which the means forming the scale pocket includes a series of spaced linear seals between the guide panels at the bottom of the scale pocket, in which the spaces between the linear seals form passageways, in which the scale member has a bottom edge formed with projecting foot means, and in which said foot means extend in said passageways when the scale member is in engaged position.

20. Sliding signal guide construction for a card file including a two-panel guide having front and rear flat transparent material panels generally rectangular in shape with top, bottom and side edges; the panels being sealed together along portions at least of the top and bottom guide edges; means forming a series of pockets between the two panels each accessible from the exterior of the guide; the pockets including a record pocket, a signal pocket, a scale pocket and a designator pocket; the scale and designator pockets extending along the top edge of the guide one at each top corner toward the other; the signal pocket communicating with the scale pocket and extending parallel with the top guide edge; a signal scale having signalling indicia along its top edge removably inserted in said scale pocket; interengageable means formed on the scale and guide holding the scale against movement laterally of the scale pocket when in engaged position with the scale indicia parallel with the top guide edge; the upper indicia-containing scale edge when the scale is in engaged position being spaced downwardly of the top guide edge; a flat L-shaped signal member having a slide leg and an upstanding signal leg, the signal member being removably received in said signal and scale pockets and slidable laterally between the side guide edges with the slide leg slidable in the signal pocket and the upstanding signal leg slidable in the scale pocket; the panels being provided with registering openings communicating with at least one of said signal and scale pockets exposing surface portions of the slide leg whereby surfaces of the slide leg may be grasped from the exterior of the guide to laterally adjust the upstanding signal leg in the scale pocket to a selected position with respect to said scale indicia; the signal leg being provided with signal indicating means registrable with a selected scale indicia when the signal leg is in an adjusted signalling position; and the upper end of the signal leg extending in the scale pocket above the upper edge of the scale when the signal leg is in signalling position and the scale is in engaged position, whereby said upper end is visible through both transparent guide panels.

21. The construction defined in claim 20 in which the top guide edge is formed with a notch intermediate the guide side edges, and in which retainer ear means project downwardly from the bottom edge of the guide.

22. A signal scale member for use in a sliding signal card file guide, the scale member being flat and card-like in shape having top, bottom and side edges and being provided with signalling indicia along its top edge, and foot means projecting downward from the bottom edge of the scale member.

23. A signal member for use in a sliding signal card file guide, the member being L-shaped with a slide leg and an unstanding signal leg, the upstanding signal leg being provided with signal indicating means.

24. A two-panel guide member for use in a sliding signal card file guide, the member having front and rear flat transparent material panels generally rectangular in shape with top, bottom and side edges; the panels being sealed together along portions at least of the top and bottom guide edges; means forming a series of pockets between the two panels each accessible from the exterior of the member; the pockets including a record pocket, a signal pocket, a scale pocket and a designator pocket; the scale and designator pockets extending along the top edge of the guide one at each top corner toward the other; the signal pocket communicating with the scale pocket and extending parallel with the top guide edge; and the panels being provided with registering openings communicating with at least one of said signal and scale pockets.

References Cited by the Examiner

UNITED STATES PATENTS

| | | | |
|---|---|---|---|
| 1,852,854 | 4/1932 | Dawson | 129—16.7 |
| 2,003,854 | 6/1935 | Cox | 129—16.7 |
| 2,689,571 | 9/1954 | Watkins | 129—16.7 |

FOREIGN PATENTS

| | | |
|---|---|---|
| 193,345 | 11/1957 | Austria. |
| 529,884 | 6/1955 | Italy. |

JEROME SCHNALL, *Primary Examiner.*